No. 801,189. PATENTED OCT. 3, 1905.
J. C. FREDERICKSEN.
ROTARY ENGINE.
APPLICATION FILED MAR. 11, 1905.
5 SHEETS—SHEET 5.
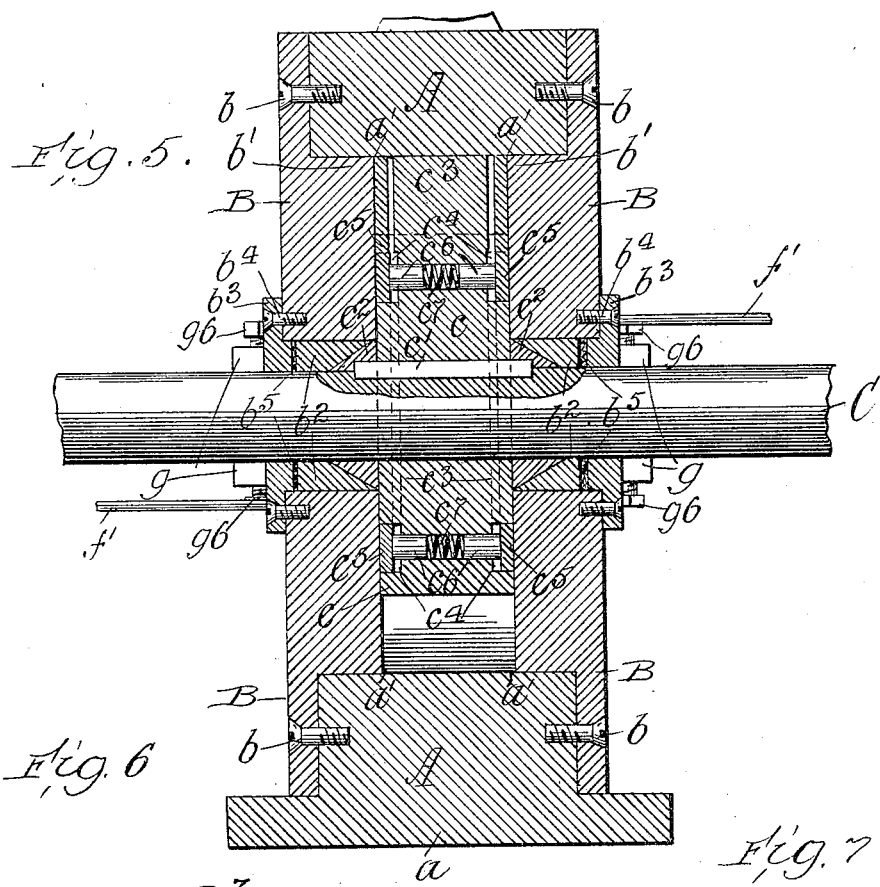
Fig. 5.
Fig. 6.
Fig. 7.
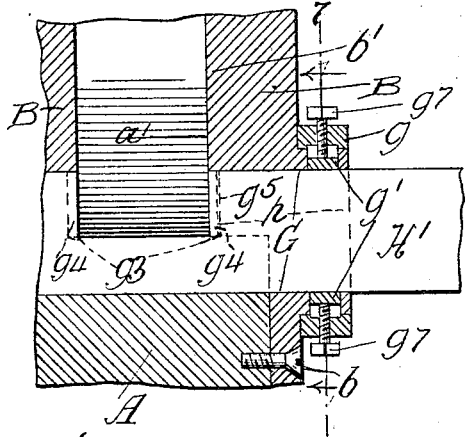
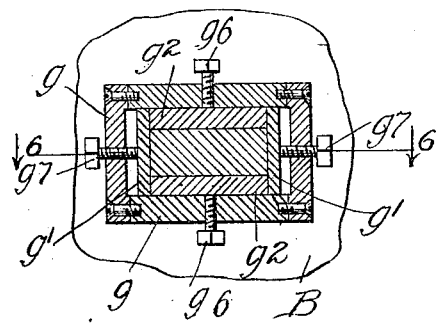
Witnesses:
Ray T. White
Harry R. LeWhite
Inventor
John C. Fredericksen
By Morgan & Prinstein, Attys

UNITED STATES PATENT OFFICE.

JOHN C. FREDERICKSEN, OF CHICAGO, ILLINOIS, ASSIGNOR OF FIVE-SIX-TEENTHS TO SAMUEL JOSEPH CASSELL, OF CHICAGO, ILLINOIS.

ROTARY ENGINE.

No. 801,189.     Specification of Letters Patent.     Patented Oct. 3, 1905.

Application filed March 11, 1905. Serial No. 249,541.

*To all whom it may concern:*

Be it known that I, JOHN C. FREDERICKSEN, a citizen of the United States, residing at 477 West Ohio street, in the city of Chicago, county of Cook, and State of Illinois, have invented a new and useful Improvement in Rotary Steam-Engines, of which the following is a specification.

The object of my invention is to so construct and assemble the several parts as to secure a maximum of power in an engine occupying a minimum of space, to secure direct action and easy adjustment of the valves, and a reversible action of all its operative parts. The manner in which I accomplish these objects is described in the following specification and illustrated in the accompanying drawings, in which—

Figure 1:
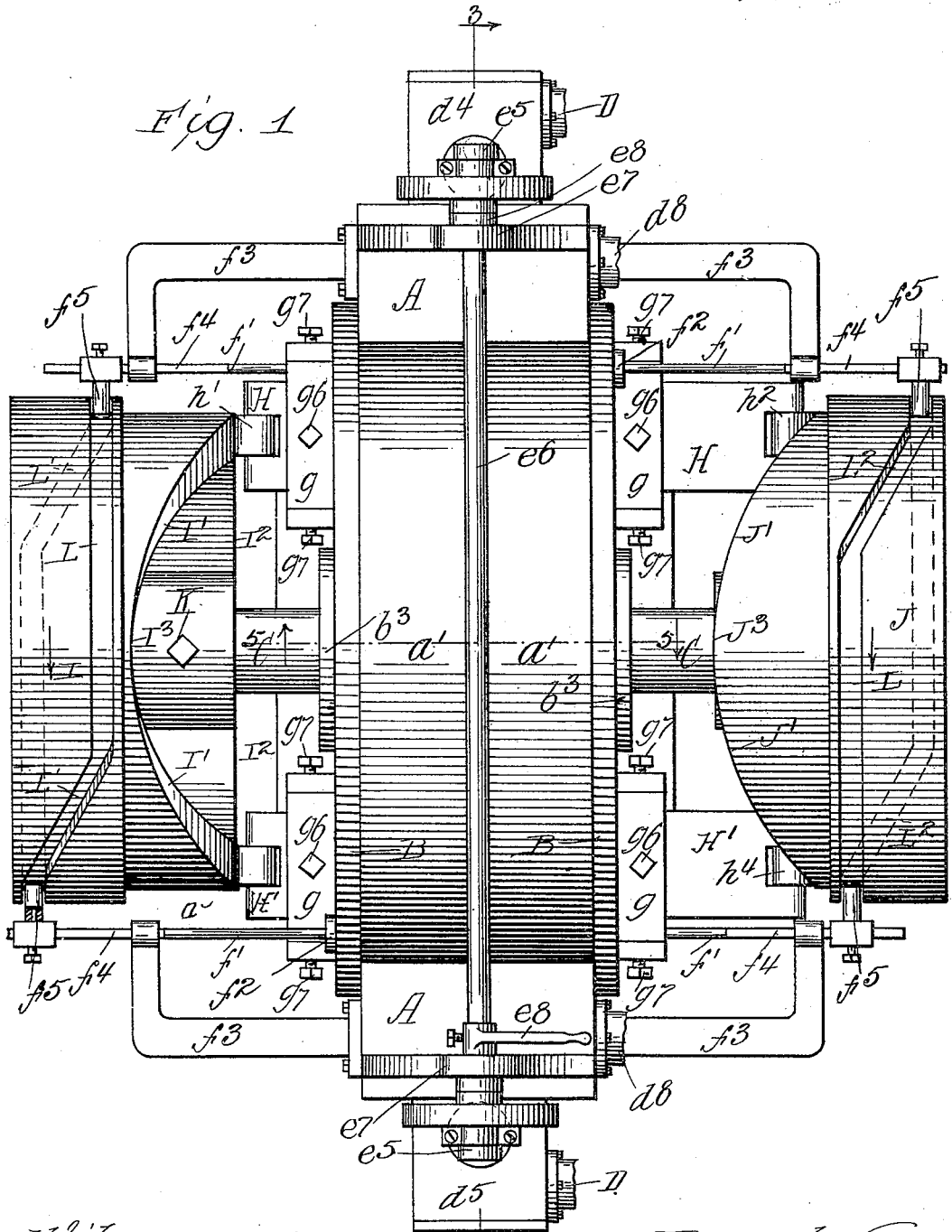
Figure 2:
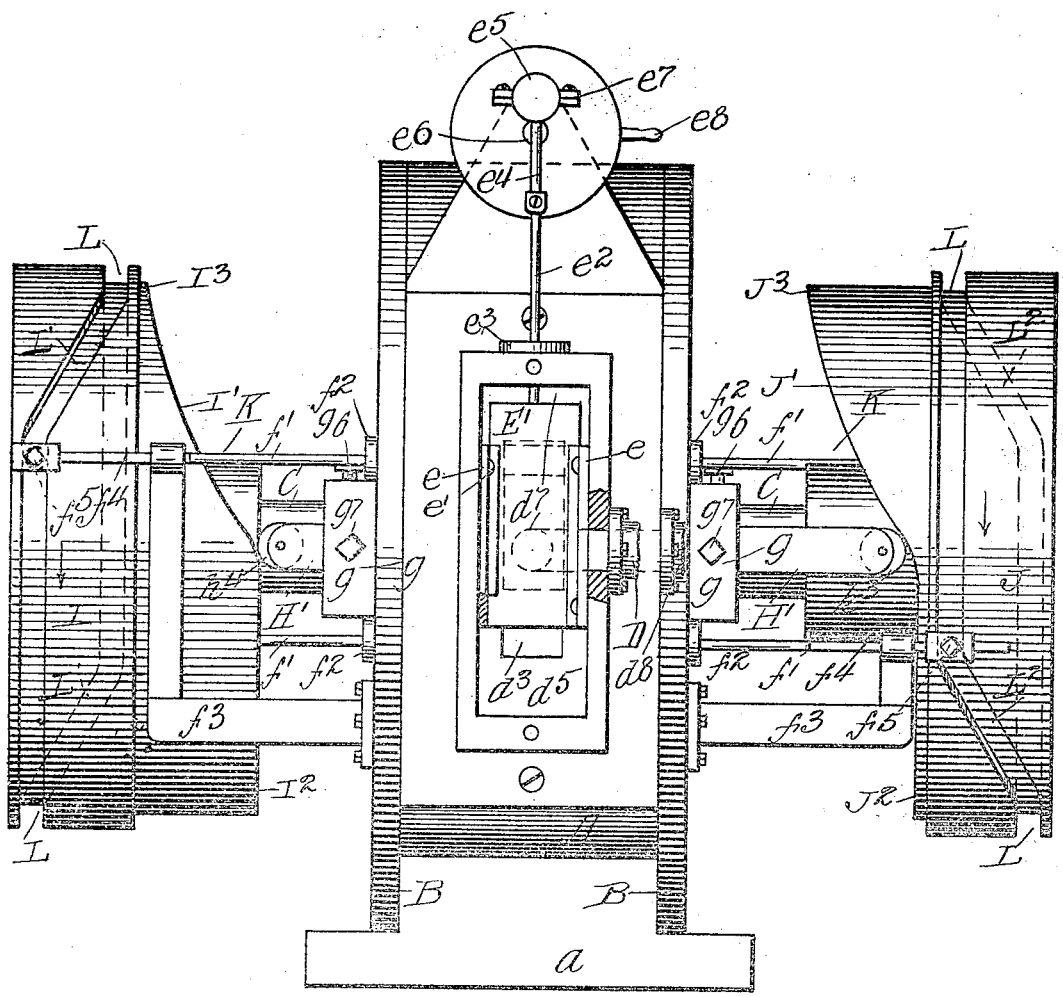
Figure 3:
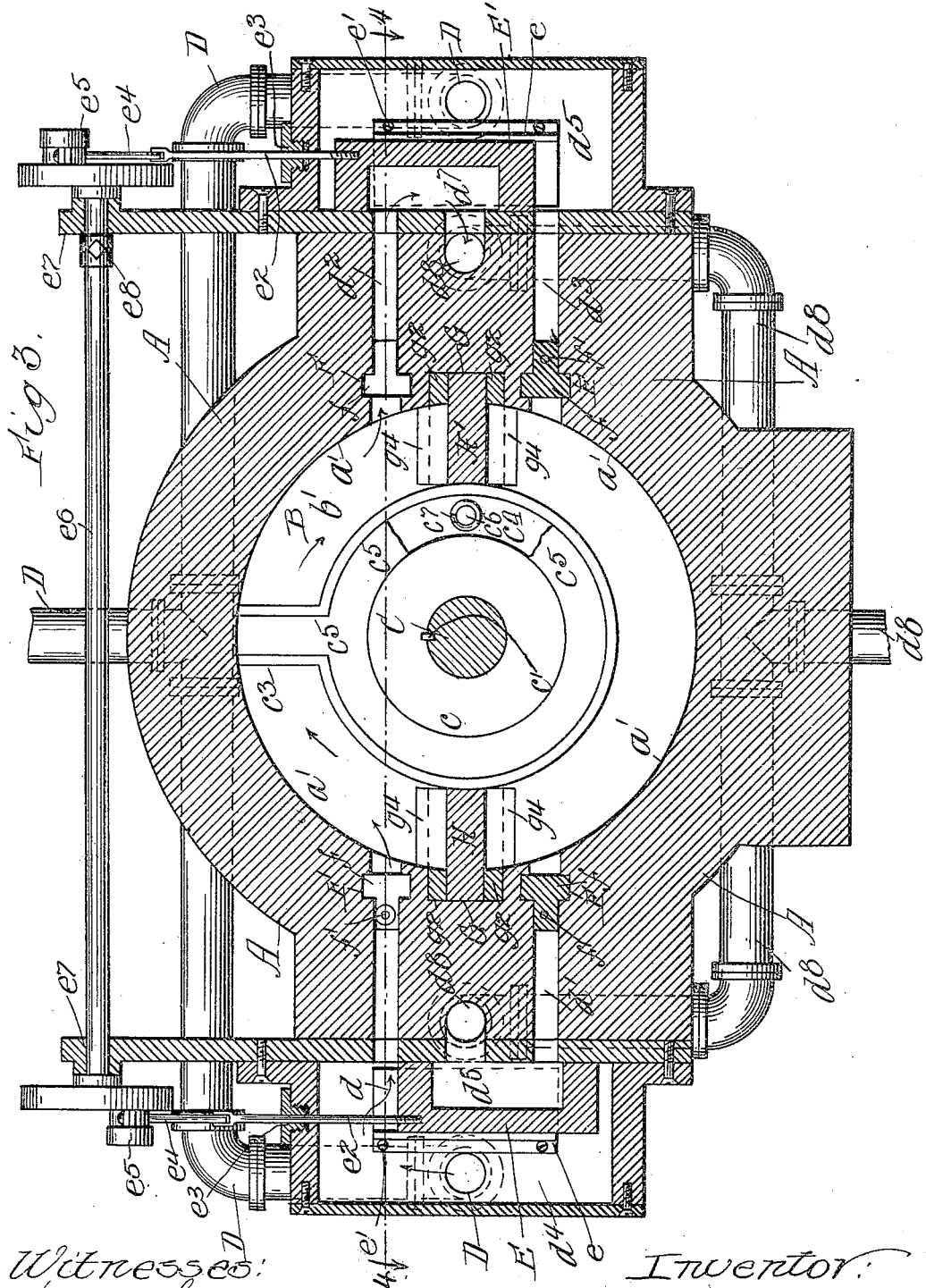
Figure 4:
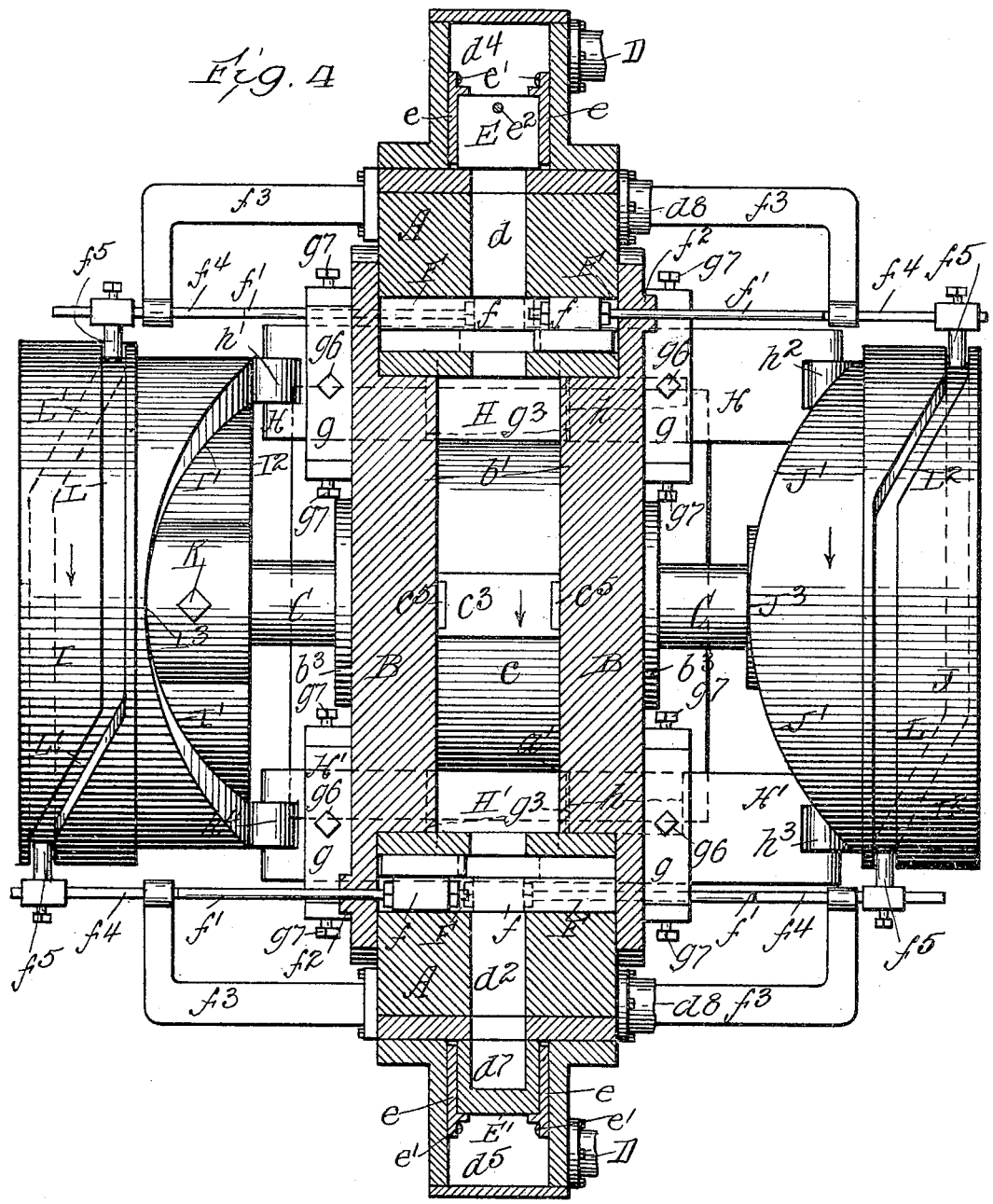

Figure 1 is a plan view of the top of the engine. Fig. 2 is a right end elevation showing the inside of the steam-chest at that end. Fig. 3 is a vertical sectional view on the line 3 3, Fig. 1, looking in the direction of the arrows. Fig. 4 is a horizontal sectional view on the line 4 4, Fig. 3, looking in the direction of the arrows. Fig. 5 is a vertical sectional view on the line 5 5, Fig. 1. Fig. 6 is a horizontal sectional view on the line 6 6, Fig. 7. Fig. 7 is a vertical sectional view on the line 7 7, Fig. 6.

In the drawings the same letters represent the same parts in the several views.

In the construction of my improvement the main body A is of one piece, including the base $a$, on which it stands, and forms the cylinder $a'$. The cylinder-heads B are secured to the cylinder by the screws $b$. The central part $b'$ of each head extends some distance into the cylinders, as shown in Figs. 4 and 5. Each of said heads is provided with a shaft-bearing $b^2$. These bearings are formed at one end as female cones and are adjustably secured in the heads by bearing-rings $b^3$, which are secured to the heads B by the screws $b^4$. Between these bearings and rings is a suitable packing $b^5$. Supported in the bearings $b^2$ is a main shaft C. This shaft extends through the center of the cylinder, as shown in Fig. 5, and is adapted in length to support the cam-wheels, hereinafter described, and suitable driving-wheels. (Not shown.) On the central part of this shaft a piston $c$ is secured by a key $c'$. The ends of this key extend beyond the sides of the piston and engage a male cone-bearing $c^2$ on each side of the piston. These cones are adapted to be slipped on the shaft and ends of the key and fit against the sides of the piston and into the female cones $b^2$. These cones and the rings $b^3$ permit the perfect adjustment of the piston-head in the cylinder.

The piston $c$ is made in the form of a thick disk with a radial projecting head $c^3$. The main circular part of the piston is about two-thirds of the internal diameter of the cylinder, and thus provides for the steam-space. The piston-head extends to the full diameter of the cylinder, as shown in Fig. 3. On each side of this piston and piston-head is a recess $C^4$, adapted to hold a packing-ring $c^5$, as shown in Figs. 3 and 5. On the inside of these rings are studs adapted to fit easily into holes extending through the piston-head. In each of these holes is a coiled spring $c^7$, compressed by the studs $c^6$. The pressure of these springs forces the packing-rings against the cylinder-heads and forms a steam-tight joint for the piston, as shown in Fig. 5.

In each end of the main body are two steam-ports $d$, $d'$, $d^2$, and $d^3$. These ports each serve either as feed or exhaust ports, the change from one service to the other being made by reversing the motion of the engine, as hereinafter described. The ports in each end are arranged horizontally one above and one below the central horizontal line of the cylinder, as shown in Fig. 3. The ports $d$ and $d'$ lead from the steam-chest $d^4$ into the cylinder and the ports $d^2$ and $d^3$ lead from the steam-chest $d^5$ into the cylinder. In each of the steam-chests $d^4$ and $d^5$, which are both supplied with steam from the steam-pipe D, is a vertical slide-valve E and E'. (Shown in Figs. 2, 3, and 4.) Each of these valves is supported in guides $e$, attached to the body A by the screws $e'$, and is adapted to be moved vertically and to leave one of the two steam-ports open and to form the exhaust-chamber over the other port and connect it with the exhaust-pipe. These valves are provided with valve-rods $e^2$, supported in the boxes $e^3$, and connecting-rods $E^4$. These rods are connected with the cranks $e^5$ on the shaft $e^6$, which is supported in suitable bearings $e^7$, affixed to the body A. This shaft is operated by a hand-lever $e^8$. A half-turn of this shaft reverses the position of the valves E and E' and changes the ports from feed to exhaust and reverses the motion of the engine. In each of the steam-ports is a valveway F. These ways extend transversely through the body A, the external openings being closed by the cylinder-heads B, as shown in Fig. 4. In each of these valveways is a slide-valve $f$, adapted to close the port. Each of these valves is attached to a valve-rod $f'$, supported in bearing-boxes $f^2$, affixed in the cylinder-heads B. Each of these rods is also supported near its ends in bearing-brackets $f^3$. The part $f^4$ of each of these rods supported in the bearings $f^3$ is a square and is adapted to prevent the rods from turning round. Attached to the end of each of these rods is a roller $f^5$, adapted to be adjusted thereon and to be engaged in a cam-wheel, hereinafter described.

In the interior periphery of the cylinder $a'$ and on opposite sides and between the steam-ports are two horizontal transverse valveways G. These ways extend through the body A and cylinder-heads B, the opening in the cylinder-heads being provided with bearing-boxes $g$, having adjustable bearings $g'$. In each of the ways G are two bearing-plates $g^2$. (Shown in Figs. 3, 6, and 7.) These plates extend through the boxes $g$, main body A, and cylinder-heads B. The center of each of these plates is recessed in the center to conform to the width and diameter of the cylinder and is held in position by lips $g^4$, which fit into corresponding recesses $g^5$ in the cylinder-heads. The ends of these plates are adjustable in the bearing-boxes $g$ and bearings $g'$ by the set-screws $g^6$ and $g^7$. Between these plates $g^2$ are the cut-off valves H and H'. Each of these valves extends through the valveways G and beyond the boxes $g$. In each of these valves is a recess $h$, corresponding in width and depth with the recess in the plates $g^2$. These recesses are located to one side of the center of the length of the valve, as shown by the dotted lines in Fig. 4. In the ends of each of these valves is a roller $h'$, $h^2$, $h^3$, and $h^4$. On the shaft C are two cam-wheels I and J, secured by the set-screws K. These wheels are provided with side cams adapted to engage the rollers and operate the cut-off valves and are also provided with cam-grooves in the face of the wheels, which are adapted to engage the rollers $f^5$ on the valve-rods $f'$ and to operate the valves $f$. The side cams of the wheel I are formed of a curved part I' and straight part $I^2$. The side cams of the wheel J are formed of a curved part J' and a straight part $J^2$. These wheels are adjusted on the shaft C so that the extreme point $I^3$ of the curved part I' and the point $J^3$ of the curved part J' are in the same line and in line of the piston-head. The straight parts $I^2$ and $J^2$ also correspond with each other, as shown in Figs. 1, 2, and 4. In the periphery of each of these wheels are straight cam-grooves L and L'. These grooves are joined by the diagonal grooves $L^2$. These grooves are adapted to receive the small rollers $f^5$, attached to the valve-rods $f'$, and to operate said rods and valves $f$ as the wheels rotate, and thereby open and close said valves, as shown in Figs. 1, 2, and 4. The rollers $f^5$ are adjustable on the rods, and are thereby adapted to set the valves $f$ in the valveways F.

When the various parts are constructed and arranged as described and shown, the movement of the several parts is as follows: The steam from the feed-pipe D enters the steam-chests $d^4$ and $d^5$. The steam passes from the steam-chests $d^4$ through the port $d$ into the upper part of the cylinder above the cut-off valve H, which is closed. The steam strikes the head $c^3$ of the piston $c$, causing it, together with the shaft C and cam-wheels I and J, to revolve to the right, as shown by the arrows in Fig. 3. During the first quarter-turn the side cams of the wheel J force the cut-off valve H' open for the passage of the piston-head. At the same time the valve H' is opening the roller $f^5$ on the valve-rod $f'$ of the valve $f$ in the port $d^2$ enters the diagonal groove L' in the cam-wheel I and closes the exhaust through that port, the valve being closed just before the piston-head passes that port. During the second quarter-turn, while the cut-off valve H' is being closed by the side cam on the wheel I, the roller $f^5$ on the valve-rod $f'$, connected with the slide-valve $f$ in the port $d'$, enters the diagonal groove $L^2$ in the cam-wheel J, the port $d^3$ is thereby opened, admitting steam from the steam-chest $d^5$ into the cylinder just before the valve H' is closed, the steam-pressure on the piston-head coming from the port $d$ and port $d^3$. As the valve H' closes the port $d$ is closed by the opposite diagonal groove in the cam-wheel J. At the same time the port $d'$ is opened by the opposite diagonal groove in the cam-wheel I. In the third quarter-turn as the cylinder-head passes the port $d'$ the port closes, the cut-off valve H is opened, the port $d^2$ is opened, and as the piston-head passes the port $d$ the valve H closes and the port $d$ opens, completing the revolution of the piston and the operation of all the operative parts of the engine, bringing all the parts into the first position. (Shown in Fig. 3.) These movements are repeated as long as the steam-pressure continues. When the engine is required to be reversed in its motions, the hand-lever $e^8$ is moved, giving a half-turn to the reversing-shaft $e^6$. This movement reverses the position of the valves E and E' and changes the steam-ports $d$ and $d^3$ into exhaust-ports and the ports $d'$ and $d^2$ into steam-ports. This change in the admission of steam and reversal of the order of the movement of the steam and exhaust valves and also of the cut-off valves drives the piston the opposite way.

What I claim, and desire to secure by Letters Patent, is—

1. In a rotary engine of the kind described the combination comprising a main body, A, having a base, $a$, and cylinder, $a'$; a pair of cylinder-heads, B, adapted to close the ends of said cylinder, a pair of steam-chests, $d^4$, and $d^5$, one at each end of said main body adapted to receive steam from a supply-pipe, $d$, each of said steam-chests being connected with said cylinder by two ports, $d$, $d'$, and $d^2$, $d^3$, and having exhausts connecting said steam-chests with an exhaust-pipe, $d^8$; a pair of vertical slide-valves, E, and E', arranged in said steam-chests, each of said valves being adapted to cover the exhaust-outlet; to cover one of said ports; to admit exhaust-steam from said exhaust-port into the exhaust-pipe, $d^8$; to exclude the steam in said chests from entering the ports so covered, and being adapted to be moved vertically, and to thereby change said ports from feed to exhaust ports, and thereby change the direction of the motion of said engine; means for changing the position of these valves; two pairs of ports in said main body, one pair of ports connecting the steam-chest, $d^4$, cylinder, $a'$, and exhaust, $d^8$, the other pair of ports connecting the steam-chest, $d^5$, cylinder $a'$, and exhaust, $d^8$; each of said ports having a transverse valveway, F, and slide-valve, $f$, each of said valves being provided with valve-rods, $f'$, and suitable bearings, $f^2$, and $f^3$, and with rollers $f^5$, said rollers being adjustably attached to said rods; a pair of valveways, G, one on each side of the cylinder, $a'$, said ways extending horizontally across said cylinder, through the cylinder-heads and main body A; a pair of bearing-plates, $g^2$, adapted to fit into said valveways, each of said plates having a rectangular recess corresponding in width and depth with the interior width and diameter of said cylinder; said plates being held in position by lips, $g^4$, adapted to fit corresponding recesses in the cylinder-heads, B, said plates being adjustably held in suitable bearings in boxes, $f^2$, forming part of said cylinder-heads by set-screws in said boxes; a pair of cut-off valves, H, and H', adapted to fit in the valveways, G, between the bearing-plates, $g^2$, and to slide therein; each of said valves having a rectangular recess, $h$, said recess being to one side of the center of said valve and being adapted in width and depth to correspond with the recess in the plates, $g^2$, each of said valves extending beyond the ends of the bearing-plates, and being provided with rollers, $h'$, $h^2$, $h^3$, and $h^4$; a main shaft, C, supported in bearings in the cylinder-heads, said bearings comprising the female cones, $b^2$, and adjustable rings, $b^3$, and the male cones, $c^2$; a piston secured on said shaft and adapted to be revolved in said cylinder, said piston having a head, $c^3$, adapted to fit the diameter of the cylinder, said piston and head having recesses, $c^4$; a pair of packing-rings adapted to fit said recesses in said piston and head; a series of springs, $c^7$, held in said piston and adapted to force said rings against the cylinder-heads; a pair of cam-wheels, I, and J, secured on said main shaft, said wheels being adapted to engage the rollers in the cut-off valves, H, and H', and to operate said valves; said wheels being also provided with grooves, L, L', and L², adapted to receive the rollers on the valve-rods, $f'$, and to operate said rods and to open and close said valves substantially as and for the purposes specified.

2. In a rotary engine of the kind described the combination of a main body, A, having a cylinder, $a'$, provided with cylinder-heads, B; a pair of steam-chests, $d^4$, and $d^5$, forming part of said main body, said steam-chests being arranged on opposite ends of said body, each of said chests being adapted to receive steam from a suitable supply-pipe, and to emit the exhaust-steam into a suitable exhaust-pipe; a pair of steam-ports connecting each of said steam-chests with the cylinder and adapted to serve either for the passage of steam into or from said cylinder, each of said steam-ports being provided with a slide-valve adapted to be operated and to close and open said ports; a pair of slide-valves, E, and E', one of said valves being arranged in each of said steam-chests and adapted to be moved simultaneously and to thereby change the direction of the admission and emission of steam into and from said cylinder, and to thereby change the direction of the movements of said engine; and means for moving said valves; a pair of valveways, G, in said main body, and bearing-plates $g^2$, adjustably held in said valveways; a pair of cut-off valves arranged in the valveways, G, between said bearing-plates, said valves extending through the cylinder-heads and being provided with antifriction-rollers; a main shaft, C, and piston, $c$, having a piston-head, $c^3$, said shaft and piston being arranged in said cylinder and supported in cone-bearings supported in the cylinder-heads, said piston and piston-head having suitable packing-rings and means for holding said rings in said piston, and of forcing said rings against said cylinder-heads; a pair of cam-wheels adjustably secured on said shaft, said cam-wheels being adapted to engage and move said cut-off valves, and to engage the valve-rods connected with the slide-valves in said steam-ports, and to thereby move said valves, substantially as and for the purposes specified.

3. In an engine of the kind described the combination comprising a main body having one cylinder, said cylinder being inclosed by two cylinder-heads; a pair of steam-chests arranged on opposite ends of said body connected with suitable feed and exhaust pipes;

a pair of steam-ports connecting said steam-chests with said cylinder; a slide-valve arranged transversely in said steam-ports, said valves being provided with suitable valve-rods and bearings; two reversing slide-valves arranged one in each steam-chest, and means for moving said valves in opposite directions at the same time, thereby changing the admission and emission of steam into the cylinder from one port to the other; a pair of cut-off valves arranged transversely in said cylinder and through said cylinder-heads, said valves being supported in suitable bearings and being adapted to be moved transversely in said cylinder and said bearings; a main shaft extending through said cylinder and cylinder-heads, supported in suitable bearings in said heads; a piston secured on said shaft and adapted to be revolved in said cylinder, said piston having a head, and suitable packing-rings adapted to be pressed against said cylinder-heads, and means for holding said rings and pressing them against said heads, a pair of cam-wheels affixed on said shaft, one on each side of said main body, said wheels being adapted to engage said cut-off valves and the steam-port valve-rods, and to operate said valves, substantially as and for the purposes specified.

4. In an engine of the kind described the combination comprising a main body having a single cylinder, said cylinder being provided with suitable heads; two steam-chests, one on each end of said main body and having suitable steam and exhaust pipes and slide-valves adapted to cover the exhaust-outlet, and to be moved in said steam-chests over the steam-ports therein; suitable steam-ports connecting said steam-chests with said cylinder having suitable valves and valve-rods; a pair of cut-off valves, extending through said cylinder and cylinder-heads; a piston arranged in said cylinder affixed on a shaft, supported in said cylinder-heads; a pair of cam-wheels affixed on said shaft and adapted to engage and operate said steam-port valves and said cut-off valves; and means for operating the valves in the steam-chests, and thereby reversing the movement of the piston, substantially as described and for the purposes specified.

5. In an engine of the kind described, the combination with a main body, A, having a cylinder, $a'$, and suitable cylinder-heads, B; steam-chests, $d^4$, and $d^5$, having suitable steam-inlet and exhaust-outlet; slide-valves, E, and E', and means for operating said valves, steam-ports, $d$, $d'$, $d^2$, and $d^3$, connecting said chests with said cylinder, said ports having suitable valves, $f$; and a pair of cut-off valves, H, and H', having suitable bearings; with a piston, $c$, and piston-shaft, C, supported in said cylinder and cylinder-heads, and cam-wheels, I, and J, supported on said shaft and adapted to engage and to operate said steam-port valves and said cut-off valves, substantially as and for the purposes specified.

JOHN C. FREDERICKSEN.

Witnesses:
THOMAS J. MORGAN,
JOSEPH STAAB.